Aug. 7, 1962  J. F. SKOLD  3,048,258
MULTIPLE CONVEYOR
Filed May 31, 1961  5 Sheets-Sheet 1
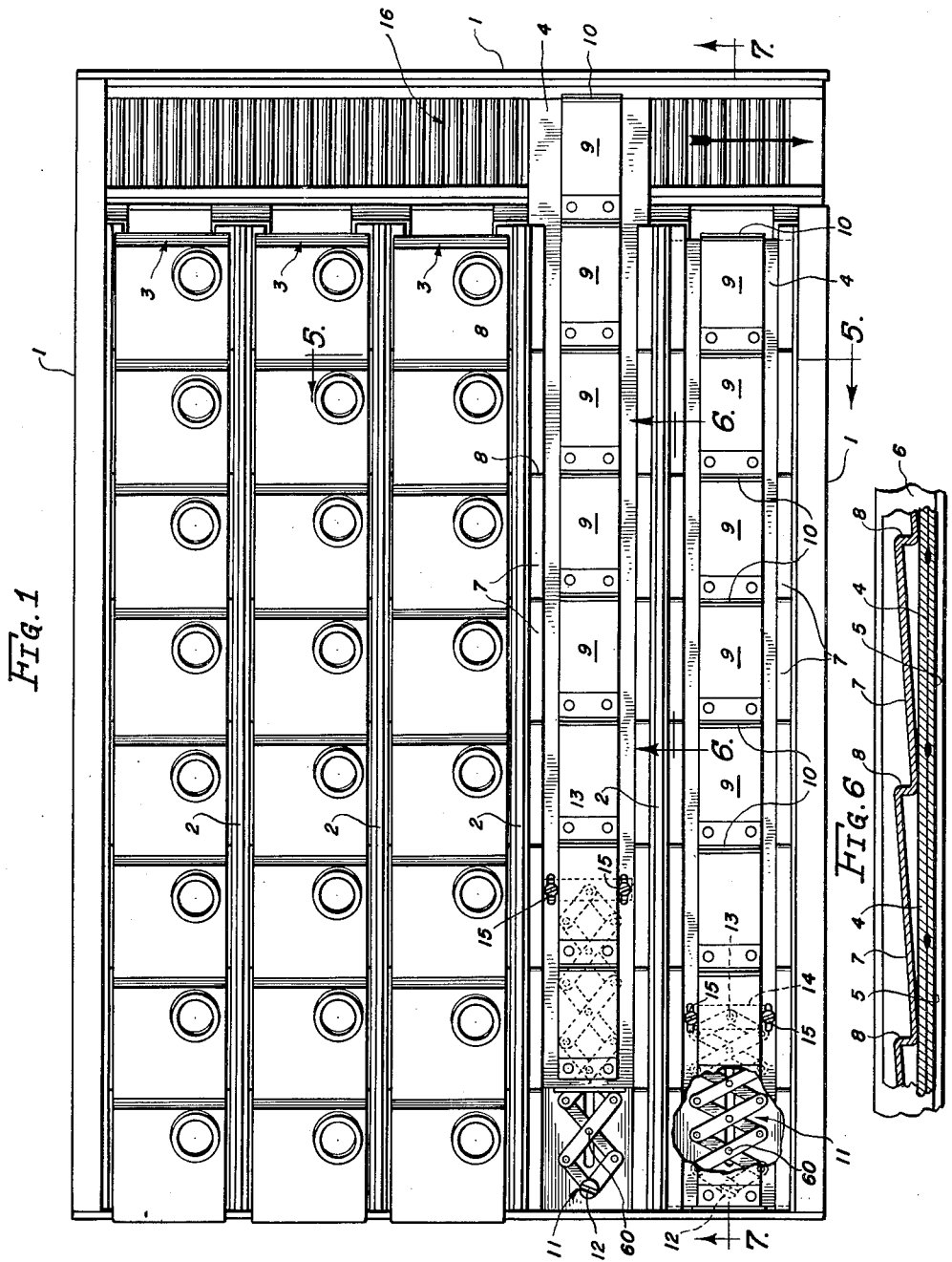
INVENTOR
John F. Skold
BY Lloyd J. Andres Aug. 7, 1962  J. F. SKOLD  3,048,258
MULTIPLE CONVEYOR
Filed May 31, 1961  5 Sheets-Sheet 2
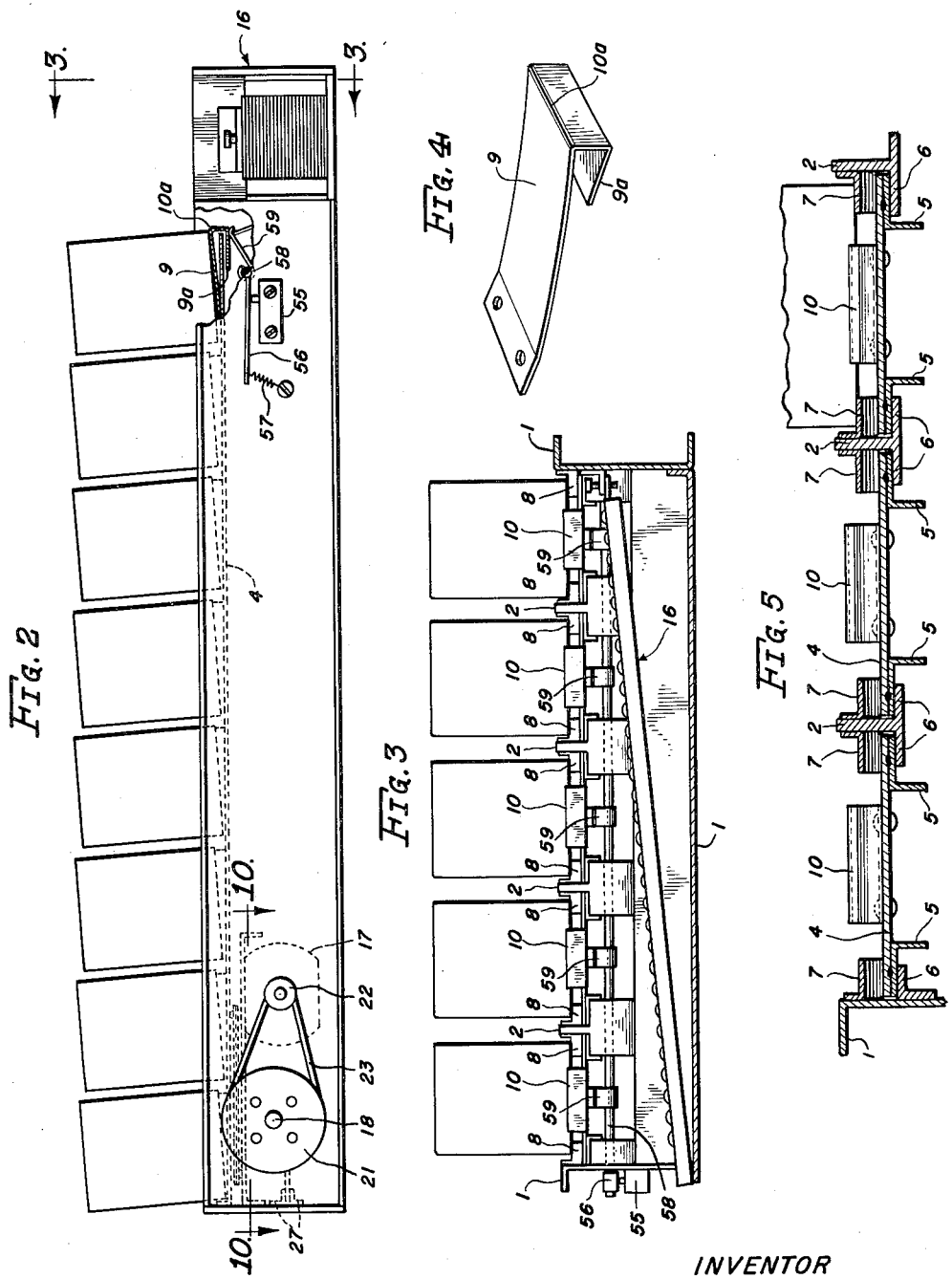
INVENTOR
John F. Skold
BY Lloyd J. Andres

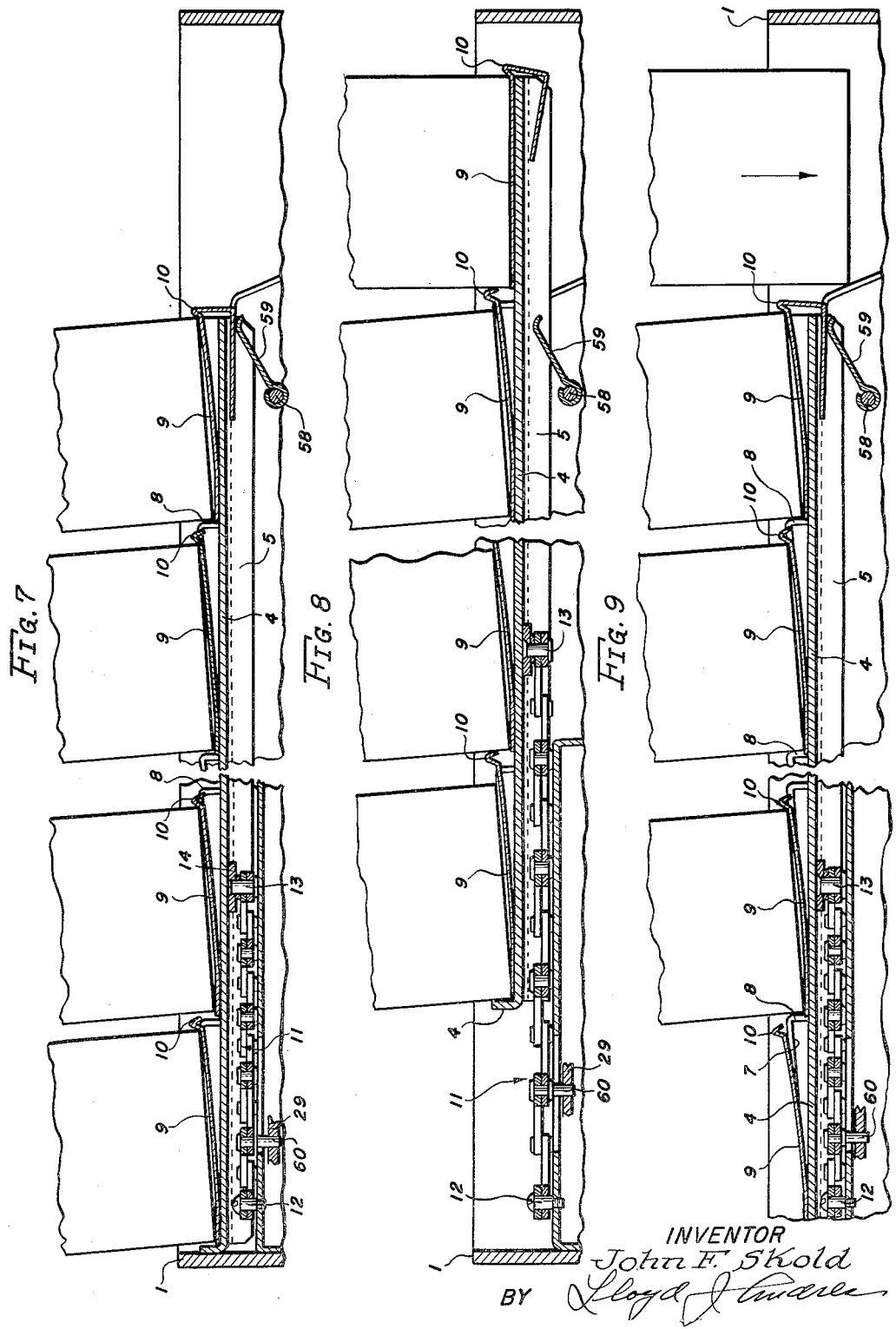

Aug. 7, 1962 J. F. SKOLD 3,048,258
MULTIPLE CONVEYOR
Filed May 31, 1961 5 Sheets-Sheet 4
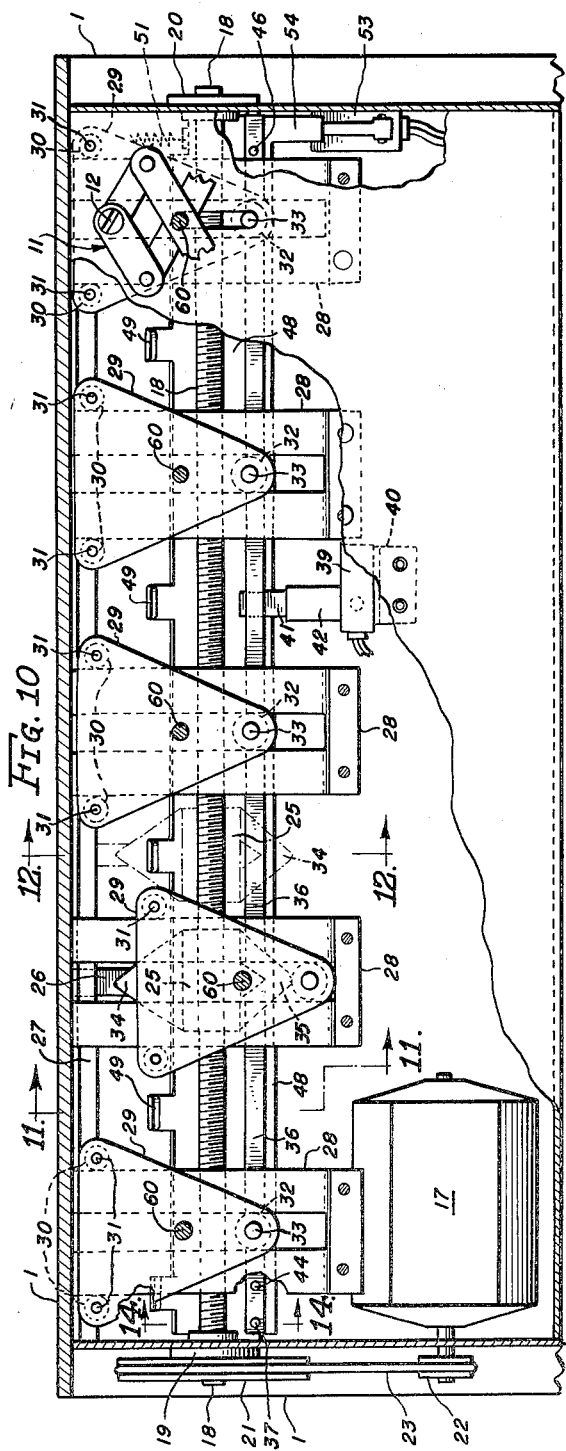
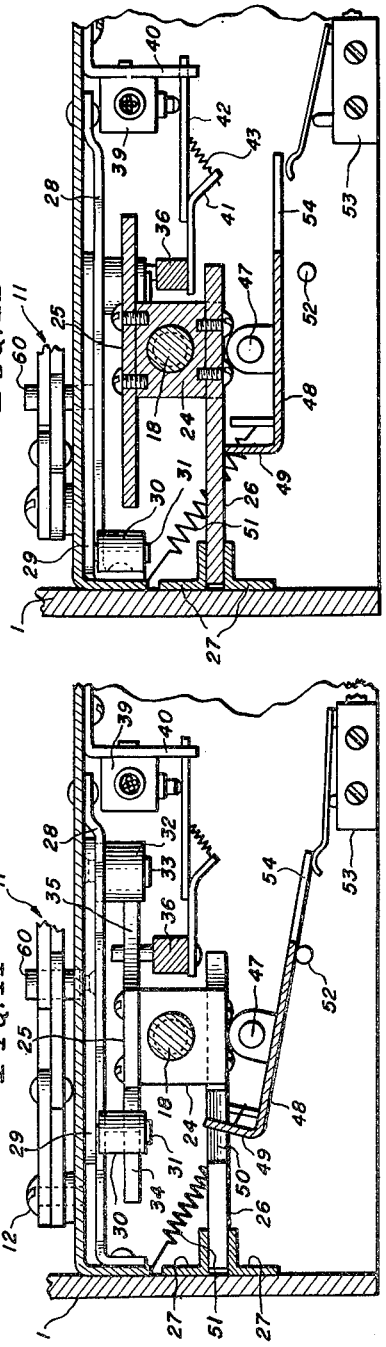
INVENTOR
John F. Skold
BY Lloyd J. Andres Aug. 7, 1962 J. F. SKOLD 3,048,258
MULTIPLE CONVEYOR
Filed May 31, 1961 5 Sheets-Sheet 5
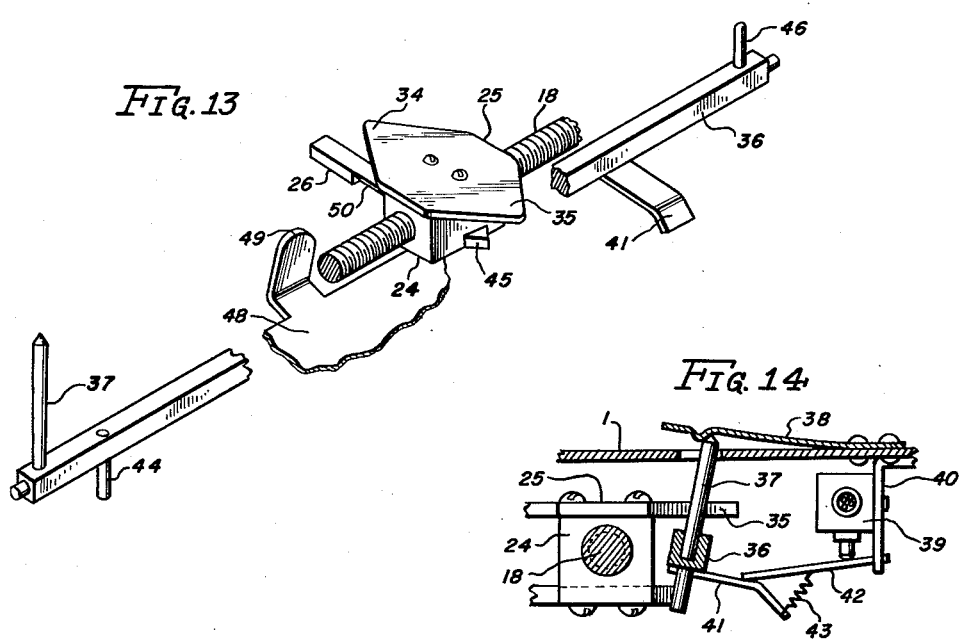
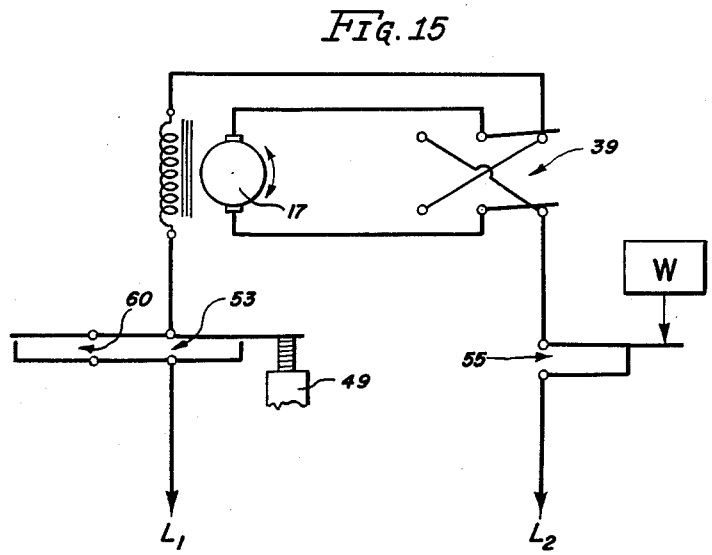
INVENTOR
John F. Skold
BY Lloyd J. Andres United States Patent Office 3,048,258
Patented Aug. 7, 1962

3,048,258
MULTIPLE CONVEYOR
John F. Skold, 4650 N. Oak Park Ave., Chicago, Ill.
Filed May 31, 1961, Ser. No. 120,114
4 Claims. (Cl. 198—75)

This invention relates in general to vending machines and more particularly to a multiple conveyor for storing, sequentially transporting and dispensing packaged commodities.

The conveyor hereinafter described has several important advantages in construction and operation not found in the well-known types which relies on the intermittent movement of endless chains or belts. It will be apparent from the following that the new features of the conveyor are applicable to a wide variety of uses in addition to their use in vending machines.

A principal object of the conveyor is the provision of a plurality of parallel positioned conveying slides responsive to a transmission means whereby each of said slides is automatically sequentially reciprocated to sequentially dispense each of the commodities stored thereon when electrically initiated.

Another object of the invention is the provision of a reciprocating slide means adapted to retain thereon a plurality of unit commodities in a row including a like plurality of gravity depressed fixed pawls and a like plurality of movable pawls for moving said row of commodities in one direction when the slide is reciprocated for sequentially dispensing said commodities from one end thereof.

Another object of the invention is the provision of a reversible transmission means whereby a group of parallel positioned conveyor slides are sequentially reciprocated in a predetermined order for sequentially dispensing unit commodities from a plurality stored on each slide.

A further object of the invention is the provision of a link drive means associated with each of a plurality of slide conveyors which are responsive to a reciprocating cam means adapted for movement lateral to the movement of said slides.

Another object of the invention is the provision of an electrically controlled motor driven transmission and a control circuit which will sequentially move each of a plurality of reciprocating conveyor slides equal distances when a control circuit is momentarily energized.

A further object of the invention is the provision of a horizontal conveyor shelf with substantially its entire area available for storing commodities in closely related rows including an operating structure having an extreme minimum height dimension for the conservation of space particularly useful when a number of said shelves are superposed, i.e., such as required in a vending machine cabinet, particularly when the cabinet includes refrigeration apparatus.

These and other objects and advantages in one embodiment of the invention are described and shown in the following specifications and drawings in which:

FIG. 1 is a plan view of the multiple conveyor shelf with a portion thereof occupied by conventional rectangular cartons.

FIG. 2 is a side elevation of the conveyor, shown FIG. 1.

FIG. 3 is an elevation of the dispensing end of the conveyor taken through section line 3—3, FIG. 2.

FIG. 4 is a perspective view of a pawl element, shown FIGS. 1 and 2.

FIG. 5 is a fragmentary elevation taken generally through section line 5—5, FIG. 1.

FIG. 6 is a fragmentary elevation taken through section line 6—6, FIG. 1.

FIG. 7 is a fragmentary elevation taken through section line 7—7, FIG. 1.

FIGS. 8 and 9, same as FIG. 7 with elements in changed position.

FIG. 10 is a fragmentary plan view taken through section line 10—10, FIG. 2.

FIG. 11 is a fragmentary view taken generally through section line 11—11, FIG. 10.

FIG. 12 is a fragmentary view taken through section line 12—12, FIG. 10.

FIG. 13 is a perspective view of fragmentary portions of the transmission elements, shown FIGS. 10, 11 and 12.

FIG. 14 is a fragmentary view of switch elements, shown in FIGS. 10, 11 and 12.

FIG. 15 is a schematic diagram of the electric circuit of the device, shown FIG. 1.

Referring to FIG. 1, a main frame or housing 1, in this embodiment, is divided by partitions or rails 2 forming five parallel runways in which five slide assemblies 3 are journalled for longitudinal reciprocating movement.

Referring to FIGS. 5 and 6, each slide assembly consists of a main plate 4 and a pair of angle members 5 welded thereto, as shown. Each member 5 bears upon supports 6 fixed to the frame 1 for reciprocating sliding movement.

Step rails 7 are formed into equi-spaced angular steps and are secured in parallel fixed relation to the frame and partitions, as shown, for the dual purpose of retaining each main plate 4 of each slide assembly and for supporting a package or carton straddling each pair of steps between each riser 8.

Referring to FIGS. 1, 4 and 7, pawl members 9 formed from flat spring material, shown in FIG. 4, are secured by one end on each slide plate 4 in linear spaced relation between each pair of steps 7 corresponding with and normally adjacent each opposite pair of steps 7.

Each pawl member 9, except those positioned at the end of each slide, includes a transverse tooth form 10 in its free end normally positioned between each carton.

The pawl is tensioned to yield downwardly its full range under the weight of a carton straddling the pawl and resting on each opposite pair of steps 7.

When the conveyor is in normal rest position, the cartons are stored, as shown in FIGS. 1 and 2, tilted at an angle equal to the slope of the steps 7.

Each of the slides 3 is independently reciprocated in its linear path by a driven motion multiplying lazy-tong assembly 11, shown in FIG. 1, in each of two positions. The links comprising the tong assembly terminate at one end in a pivotal stud 12 secured to frame 1 and at the opposite end in a pivotal stud 13 secured in each slide 3.

A cross member 14 retaining each stud 13 is adjustably secured to each slide by screws 15 to provide means for adjusting each slide into register with the steps 7.

A conventional roller conveyor assembly 16 is mounted at a descending angle adjacent the delivery end of the device in the path of gravitation of each carton to illustrate a delivery means for conveying each ejected carton in a path indicated by arrow, FIG. 1.

FIG. 7 illustrates four cartons resting in one runway of the device on the steps 7 in normal rest position. FIG. 8 illustrates the position of the same cartons when the slide assembly 3 is moved to a forward position. The upturned end of plate 4 will slide the rearmost carton and the pawl members 9 will slide the remaining cartons over each riser 8 to occupy the next forward successive position on step 7 with the outermost carton suspended above the roller conveyor 16.

When the slide assembly 3 is retracted, the outermost carton will abut the endmost riser 8 and be discharged and descended by gravity, as illustrated by arrow, and the remaining cartons will remain in an advanced rest position shown, for further movement by the next reciprocation of the slide assembly 3.

Referring to FIG. 10, the transmission for sequentially reciprocating each slide assembly is driven by a reversible electric motor 17 under the control of switches to be hereinafter described.

A main drive screw 18 is journalled for rotation in one end of frame 1 transverse the runways and is retained in bearings 19 and 20 for rotation by the motor 17 and pulleys 21, 22 and belt 23.

A follower nut 24, better shown in FIGS. 11, 12 and 13, is threaded on screw 18 for transverse travel when the latter is rotated and carries a dual cam member 25 secured to its upper side and a control member 26 on its lower side with the end thereof slidably retained between two fixed guides 27 on frame 1. It is now apparent that the nut 24 and its members will travel laterally when the motor is energized.

Referring to FIGS. 10, 11 and 12, a cam follower bracket 28 is secured to frame 1 beneath each runway and is provided with a slot therein parallel with its side edges, as shown, for retaining a follower member 29 by means of a pair of rollers 30 journalled on studs 31 and straddling the sides of bracket 28. Another roller 32 journalled on stud 33 on each follower 29 is positioned in each slot in the bracket 28, as shown.

The rollers 30 and 32 are positioned in the path of movement of opposite end portions 34 and 35 of cam 25, respectively. Each cam follower 29 is pivotally secured to each lazy-tong assembly 11 by a stud 60 for reciprocating the latter in a direction normal to the movement of the follower.

It is now apparent that when each slide 3 and its corresponding lazy-tong is retracted and the cam 25 is driven in its lateral path, roller 32 will be engaged by the oblique portion 35 of cam 25 which will transmit linear motion to the lazy-tong and the extension thereof will move a corresponding slide to its extended position.

Further movement of cam 25 will then engage either one of the rollers 31, (depending on its direction of movement), with the oblique portion 34 of cam 25 and retract the slide to its normal rest position. It is now apparent that when the cam 25 is driven from one side of the device to the other and vice versa, each cam follower 29 and each slide assembly 3 will be sequentially reciprocated and sequentially deliver cartons from each of the runways, as previously described.

In order to utilize the above mechanism to sequentially deliver a single carton from each runway when electrically initiated, a control rocker 36, best shown in FIG. 13, is journalled by its ends in frame 1 parallel and below screw 18.

A toggle pin 37 in and near one end of rocker 36 extends upward through an aperture in frame 1 and its end is in engagement with an over-center detent spring 38, as shown in FIG. 14; thus, the rocker may be retained in each of two positions.

A motor reversing switch 39 is retained to a bracket 40 on frame 1, as shown, for operation by a lever 41 on rocker 36 and a lever 42 hinged to bracket 40, which levers are biased together by spring 43. Thus, the switch will assume its forward or reverse position dependent upon the position of rocker 36.

Referring to FIG. 13, a downward depending reversing pin 44 in rocker 36 is positioned in the path of movement of an oblique reversing cam 45 on nut 24 when the rocker is in position, shown in FIG. 14.

An upward projecting reversing pin 46 near the opposite end of rocker 36 is positioned in the path of movement of the portion 35 of cam 25 when the rocker is in a position opposite that shown in FIG. 14. It is now apparent that the reversing switch will be operated when the cam 25 reaches either end of its travel to reverse the motor 17 in order that the cam 25 will be automatically driven in both directions.

Since it is desired to stop the operation of the device following the delivery of a single carton from each runway, and referring to FIGS. 10, 11 and 12, a second rock shaft 47 pivoted at its ends in opposite sides of frame 1 has secured thereto a plate 48 having equi-spaced projections 49 upturned and corresponding to each slide 3 and positioned in the path of movement of an oblique cam 50 in control member 26, FIG. 13. The projections are normally biased upward by spring 51 with plate 48 resting against a stop 52 in frame 1 with the projections 49 in the path of movement of member 26, as shown in FIG. 11.

A normally closed switch 53 has its operating lever in the path of movement of a lever 54 integral with plate 48 thus following the reciprocation of each slide by cam 25, the cam 50 will engage a projection 49 and operate switch 53 and de-energize a circuit to the motor 17. It is to be noted that this operation will take place regardless of which direction the cam 25 is driven.

It is to be noted that each endmost pawl 9 has an underfold portion 9a for operating a switch to be hereinafter described. FIGS. 2 and 4 illustrate a preferred form of the endmost pawl 9 in which the tooth form 10, shown in FIGS. 7, 8 and 9, is modified into a radiused corner 10a in order to provide for a smoother discharge of the carton.

Referring to FIG. 2, a normally open sold-out switch 55 is secured to frame 1 for operation by a lever 56 urged toward open position by spring 57.

Lever 56 is secured to a shaft 58 pivoted transverse all runways from which a finger 59 rests against the underfold portion 9a of each of the endmost pawl members 9. Thus, when the last carton is delivered from the runways, the absence of load from the last pawl 9 will permit same to rise and then permit spring 57 to open switch 55 and de-energize the main circuit to the device.

FIG. 15 illustrates the power and control circuits used in connection with the device in which an operating switch 61 is momentarily closed to initiate the delivery of one carton from the conveyor. The momentary shorting of switch 53, completes a circuit from one side of a power line $L_1$ through motor 17, through the reversing switch 39, through the sold-out switch 55 to the other side of the line $L_2$. When the motor operates the transmission, a carton will be delivered from one of the runways and a projection 49 will open switch 53 and de-energize the motor. It is apparent that the reversing switch 39 will operate when the cam 25 reaches either side of the device which will continue the delivery from successive runways in reverse order. When the last carton is delivered, switch 55 will open and de-energize the entire circuit.

Having described my invention, I claim

1. A multiple conveyor for storing, transporting and sequentially discharging therefrom each of a plurality of like articles comprising means forming a frame, means in said frame forming a plurality of parallel planar positioned runways for retaining said articles in a like plurality of linear rows, each of said runways having a predetermined number of equi-spaced fixed oblique steps oppositely disposed at each side thereof adapted to permit movement of said articles in one direction in each of said runways, a slide member retained for reciprocating movement in each of said runways, a plurality of pawls corresponding in number and position to said steps projecting upward from each said slide member, each of said pawls adapted to yield downwardly by the gravitation of each of said articles resting upon each opposite pair of said steps, a transmission means for sequentially reciprocating each said slide a distance substantially equal to the length of each of said steps when driven, power means for driving said transmisison when energized whereby the sequential reciprocation of each said slide will move each of its said pawls and engage each said article in each corresponding said row and move the latter in said direction over a next successive pair of said steps and discharge the foremost of each said articles in each said row from each said runway when said power means is energized.

2. The combination of elements recited in claim 1 including a stop lever member journalled for oscillation in said frame transverse said runways and positioned in the path of movement of all said pawls positioned at the outer end portion of each of said slide members, electric switch means on said frame articulated with said member and normally held in closed circuit position by the force of gravity of any of said articles resting in their outermost positions on any of said runways, urging means normally tending to rotate said member and permit said switch means to assume its open circuit position against the restraining action of any said pawl when the latter is held in downward position, a source of electric power, a circuit means connecting said power means with said source of electric power whereby the discharge of the last of said articles from said runways will release the remaining one of said downward positioned pawls and permit said urging means to operate said switch means and deenergize said power means.

3. In a conveyor of the character described, means forming a frame, a plurality of parallel runways positioned in said frame in planar relation, each of said runways including a predetermined number of oppositely disposed fixed oblique steps for retaining a like said number of articles thereon in a row, said steps constructed and adapted to permit linear movement of said articles in one horizontal direction, a slide means retained in each of said runways adapted for reciprocating movement therein, a like said number of yieldable pawl means on each of said slide means for engaging each of said articles and moving same in said direction a distance equal to the length of each of said steps when said slide means is reciprocated, a cam follower means retained in said frame corresponding with and coupled to each said slide means adapted for reciprocating movement parallel to said slide means for independently reciprocating each of said slide means said distance when operated, a cam journalled in said frame for movement normal to and in the path of movement of each said follower means adapted to sequentially engage each of the latter for sequentially reciprocating each said slide means when driven, power means coupled with and adapted to drive said cam when energized whereby said yieldable pawl means on each said slide means will sequentially move each said row in one direction and discharge the foremost said article in each said row from each said runway when said power means is energized.

4. A multiple conveyor for storing, transporting and sequentially discharging therefrom a plurality of like articles comprising means forming a frame, a predetermined number of planar positioned parallel runways in said frame for retaining a plurality of said articles in a like number of linear rows, a like plurality of fixed oblique step means in each said runway for independently supporting thereon a like number of said articles and permitting mutual movement thereof in one direction, yieldable pawl means journalled for reciprocation in each said runway, said pawl means positioned and adapted to independently engage each of said articles on said step means and move same in said direction a predetermined distance when each said slide is reciprocated, a cam follower means in said frame including a link coupling to each said pawl means for reciprocating the latter when operated, a cam means journalled for reciprocating movement in said frame transverse said runways and positioned in the path of movement of each of said follower means, said cam means shaped and adapted to sequentially engage and operate each said follower means when reciprocated in either direction of said reciprocating movement, screw means journalled in said frame about an axis parallel the path of movement of said cam means and threaded therethrough for reciprocating the latter when rotated in opposite directions, reversible power means coupled to said screw means for sequentially rotating the latter in opposite directions when energized, reversing means connected to said power means positioned to be engaged by and responsive to said cam means at each end of its said movement for reversing said power means whereby the endmost said article in each successive runway will be sequentially discharged therefrom when said power means is energized.

References Cited in the file of this patent
UNITED STATES PATENTS

| | | |
|---|---|---|
| 2,592,010 | Cole et al. | Apr. 8, 1952 |
| 2,621,994 | Sadler | Dec. 16, 1952 |
| 2,633,958 | Childers | Apr. 7, 1953 |